United States Patent [19]

Somlyody

[11] 4,311,361
[45] Jan. 19, 1982

[54] ELECTROPHORETIC DISPLAY USING A NON-NEWTONIAN FLUID AS A THRESHOLD DEVICE

[75] Inventor: Arpad Somlyody, Mendon, N.Y.

[73] Assignee: Burroughs Corporation, Detroit, Mich.

[21] Appl. No.: 129,892

[22] Filed: Mar. 13, 1980

[51] Int. Cl.³ ............................................. G02F 1/29
[52] U.S. Cl. ..................................... 350/267; 350/363
[58] Field of Search ....................... 350/267, 362, 363

[56] References Cited

U.S. PATENT DOCUMENTS

| | | | |
|---|---|---|---|
| 3,512,876 | 5/1970 | Marks | 350/267 |
| 3,626,410 | 12/1971 | deKoster | 350/267 X |
| 3,736,043 | 5/1973 | Sambucetti | 350/267 X |
| 4,062,009 | 12/1977 | Raverdy et al. | 350/267 X |
| 4,068,927 | 1/1978 | White | 350/267 X |
| 4,126,528 | 11/1978 | Chiang | 350/363 X |
| 4,203,106 | 5/1980 | Dalisa et al. | 350/362 X |
| 4,218,302 | 8/1980 | Dalisa et al. | 350/362 X |

FOREIGN PATENT DOCUMENTS 2505059  8/1975  Fed. Rep. of Germany ...... 350/267

*Primary Examiner*—John K. Corbin
*Assistant Examiner*—Matthew W. Koren
*Attorney, Agent, or Firm*—Edward J. Feeney, Jr.; David G. Rasmussen; Kevin R. Peterson

[57] ABSTRACT

An electrophoretic display device using a non-Newtonian fluid as the display liquid is disclosed. Such a liquid provides superior threshold characteristics and enables the creation of an improved matrix display.

7 Claims, 3 Drawing Figures

ELECTROPHORETIC DISPLAY USING A NON-NEWTONIAN FLUID AS A THRESHOLD DEVICE

BACKGROUND OF THE INVENTION

This invention relates to an electrophoretic display device. The principle of operation of such a display is based on two phenomena. They are:

(1) Charged particles, when suspended in a liquid medium and subjected to a uniform electric field, experience a force and undergo translation along the field.

(a) When such particles arrive at the wall of the cell they will adhere to the wall due to some combination of forces which may include van der Walls attraction and electrostatic forces.

If the particles are micron-sized and have a density comparable to the density of the liquid medium, they will remain in suspension for extended periods of time without settling out. In a display application, the liquid may be dyed some dark color, e.g. black. On the other hand, a color contrasting to the liquid will be chosen for the particles. Typically, Titanium dioxide has been used for its high reflectance white color. The cell may consist of two glass plates separated by a spacing of around 0.001" and sealed around the edges. Electrodes on the inside of the glass plates may be formed by means of transparent Tin oxide layers. In the unenergized state, the cell appears black, i.e., the color of the liquid. When a potential is applied to the opposing electrodes, the particles migrate to one wall and cause the appearance of that wall to change to white. If the potential is now removed, the particles continue to stay on the wall indefinitely. A reversal of the polarity of applied voltage causes the particles to leave the wall and travel to the opposite wall. If the electrode on one wall is in the shape of a character, then that character can be made to appear alternately with the above sequence of potentials applied.

Simple displays of such configuration have been fabricated by many for laboratory demonstrations of several numeric digits per display. In each case every segment of every digit was driven by a separate driver circuit.

The structure and principle of operation of a usual electrophoretic display panel is described in detail, for example in U.S. Pat. No. 3,668,106. The electrophoretic display panel comprises a cell formed by two opposed transparent insulating substrates which have transparent electrodes formed thereon, respectively and an electrophoretic suspension, which consists of fine particles of colored electrophoretic material suspended in a colored suspending medium, in said cell. When a D.C. voltage is applied to the cell, the particles are moved and deposited on one electrode according to the polarity of the electrophoretic material, and the thus formed image is observed by reflective light.

In a conventional electrophoretic display panel, the thickness of the suspension layer can be anywhere from a few microns to several mils and the display is usually operated by a D.C. voltage. The electro-optical transfer characteristic of such a display normally does not make possible an X-Y matrix selection of cells. This is caused by a characteristic of the electrophoretic cell whereby the change of optical state is time dependent but not voltage dependent. That is, nearly any small voltage across a cell will cause it to eventually change its optical state. The magnitude of the applied voltage merely affects the time it takes for the optical change of state to occur. Furthermore, the effect of repeated application of a small potential is cumulative and with sufficient cumulative volt-seconds applied a given cell will change its optical state.

One fundamental requirement of a display cell when connected in a matrix addressing fashion is to exhibit a definite threshold, that is a highly non-linear electro-optic transfer characteristic. When a voltage below the threshold value is applied to the cell repeatedly, the optical state of the cell must change. However, when twice the previous value of potential is applied, the cell is required to quickly change its optical state. If this condition is not met, then the display will show severe crosstalk. That is, elements which are not required to produce a picture will begin to turn on and elements which are a required part of the picture may begin to turn off.

In a conventional multiplexed matrix addressed electroluminescent display, this problem is overcome by an inherently highly non-linear electro-optic transfer characteristic exhibited by thin film electroluminescent cells. If the normal excitation of such cell is a voltage of value E which produces a light output of value Q then $\frac{1}{2}$ E will produce a light output of $10^{-3} \times Q$. This highly non-linear transfer characteristic of the electroluminescent cell makes its use in matrix displays possible.

It is possible to connect in series with a display cell another device that has a highly non-linear volt-ampere characteristic and thereby enhance the non-linear electro-optic transfer characteristic of the series combination. Typical of such non-linear devices are Diodes, Zener Diodes, Varistors and the like. A disadvantage of such combinations is the increased complexity of the overall display, increased manufacturing difficulties and increased cost.

It is therefore much more desirable to find a display cell which inherently exhibits such a threshold or non-linear electro-optic transfer characteristic.

Thus, a fundamental limitation of earlier electrophoretic displays was the lack of a threshold in the transfer characteristic. This means that the particles begin to move at the smallest voltage applied. As the voltage is increased the particles move faster. A desired threshold characteristic would be a lack of any translation of the particles at applied voltages below a certain threshold no matter how long or how often that potential may be applied. When the applied potential is nearly twice the threshold potential then the particles should move at useful velocity.

Large matrix displays can be practical only by using X-Y addressing techniques to substantially reduce the total number of driver circuits required. However, X-Y addressing, of course, requires that each display cell exhibit a definite threshold.

SUMMARY OF THE INVENTION

Therefore, an object of the present invention is to provide a new and improved electrophoretic device for displaying and/or recording an image.

Another object of the invention is to provide an improved electrophoretic matrix display panel which can display a selected image without crosstalk into a non-selected element.

It is another object of this invention to provide an electrophoretic display cell which uses a non-Newtonian fluid to provide the desired threshold characteristics.

It is a further object of this invention to provide an electrophoretic display cell having such threshold characteristics which may be used in a large matrix display.

These and other objects of this invention may be achieved and will be made more apparent from the following detailed description, the accompanying drawings and the appended claims.

IN THE DRAWINGS

DETAILED DESCRIPTION OF THE INVENTION

Figure 1:
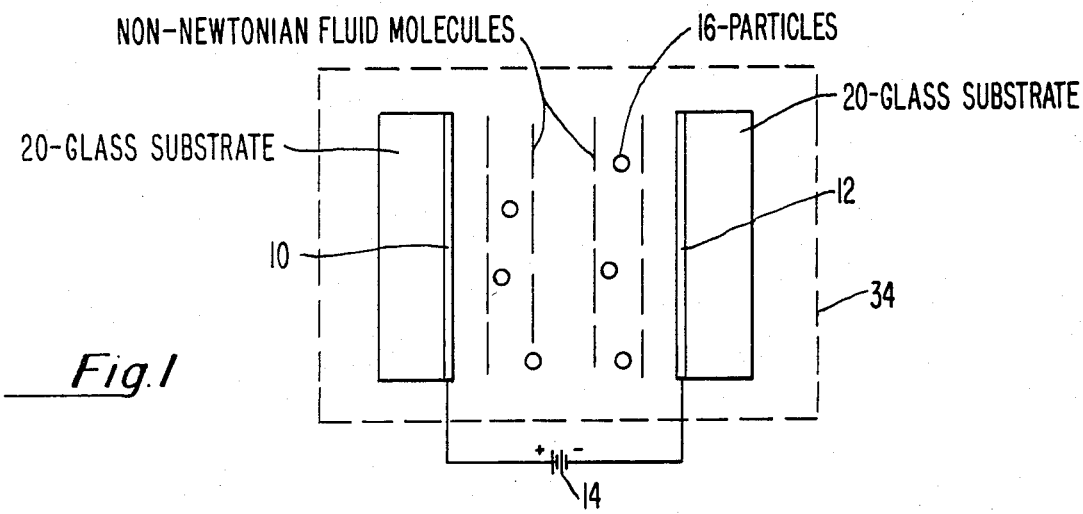
FIG. 1 illustrates a cell having the liquid aligned parallel to the walls of the cell on both sides with the electric field below the threshold level.

Referring now to FIG. 1, there is shown a representative electrophoretic cell. It shows a non-Newtonian fluid 18 in place of the liquid in an electrophoretic cell. Non-Newtonian fluids are substances that are thixsotropic in nature. They exhibit very high effective viscosity while at rest, but show a marked decrease in viscosity when subjected to shear. When an electric field below the threshold is applied the particles 16 remain stationary due to the thixsotropicity of the surrounding medium. Thus, the particles experience a net force along the field, and the fluid, at first, prevents any motion of particles. When the electric field is increased, the fluid exhibits a threshold, the viscosity suddenly decreases and the particles become free to move along the field.

FIG. 1 shows how the fluid 8 is aligned parallel to the walls of the cell on both sides. The fluid is dyed using some non-pleochroic dye to a dark color as in the normal electrophoretic cell. The small particles 16 which may again be Titanium dioxide, are dispersed within the non-Newtonian medium. Now, when a small electric field is created across the cell by an applied potential 14, a field which is below the critical transition, the fluid molecules 18, remain unchanged in their orientation. Under this condition, the motion of the particles 16 is significantly hindered. In other words, the apparent viscosity of the medium in the direction of the applied field is very high.

Figure 2:
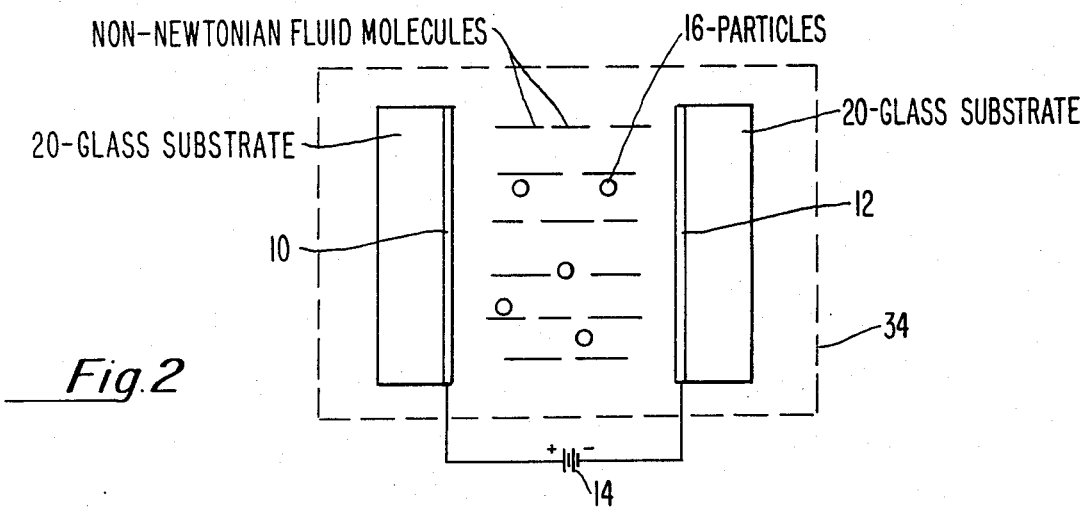
FIG. 2 illustrates the same cell when an electric field is increased to exceed the threshold level and the liquid molecules abruptly change orientation and line up normal to the cell surfaces.

Now, if the potential 14 across the cell is increased, as shown in FIG. 2, to a value above where the critical transition occurs, the fluid molecules 18 abruptly change orientation and line up normal to the cell surfaces parallel to the applied electric field. This also happens to be the desired direction of motion of the particles. The medium now presents relatively low hinderance to the motion of the particles, that is the vicosity of the medium has suddenly dropped and the particles can move to the cell wall.

This is exactly the kind of behavior desired and results in a usable threshold for the electrophoretic cell.

Figure 3:
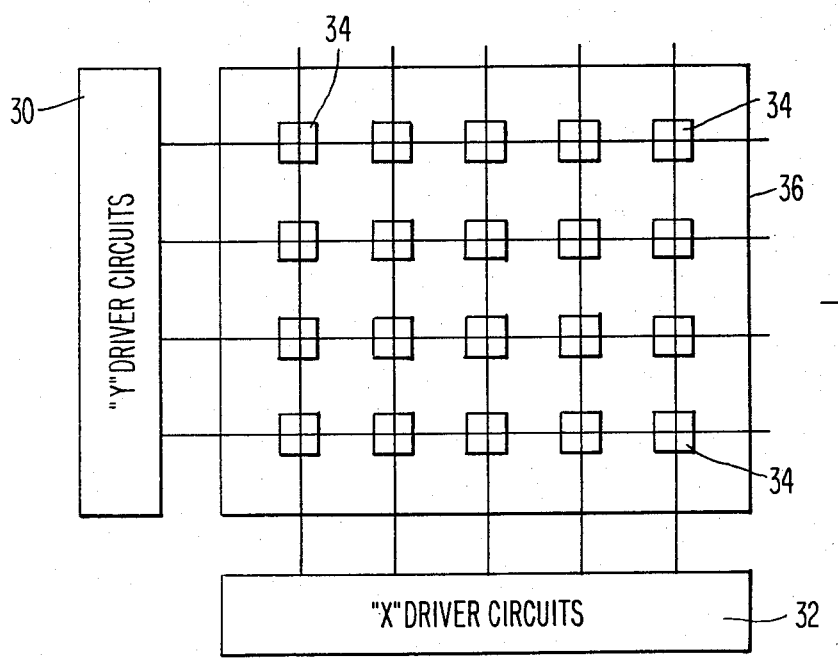
FIG. 3 illustrates a large scale matrix, each cell of which is the cell shown in FIG. 1.

Next consider FIG. 3 where there is shown a matrix 36 of the cells 34. One fundamental problem of applying the electrophoretic phenomenon to a large capacity matrix display has been the lack of threshold characteristics exhibited by the electrophoretic cells. The requirement for threshold characteristics arises from the X and Y addressing of the cells in the matrix 36 by the X drivers 30 and the Y drivers 32. The state of the cell must not change in response to repeated applications of one-half of full excitation. However, the cell must change state (color) with a single application of full excitation.

The excitation may take several different forms of energy input. For example, it may take the application of a potential difference between the X and Y conductors. So if we make the plus side of the potential source 14 shown in FIG. 1 an X conductor with an applied voltage $+E$ and the negative side a Y conductor with an applied voltage $-E$ we may determine that a signal from either the X conductor or the Y conductor alone that is a potential of only magnitude E may not exceed the threshold level of the individual cell. Consequently, a signal of value E (excitation) from either side will not cause a change of state of the cell. However, if a pair of appropriate signals are simultaneously applied to the cell from the X and Y conductors resulting in a potential of 2 E across the cell a change of state will take place.

Thus, it is seen that most earlier electrophoretic cells did not have a distinct threshold level. That is, the slightest elevation of potential caused the transport of some charged micron-sized particles. It is well known that electrophoretic cells operate by the transport of charged micron-sized particles in an electric field from one wall to the opposite wall. However, these charged particles normally respond linearly to the applied electric field and the cell does not exhibit a threshold characteristic.

A further example of the form which the energy input may take is the concurrent application of a spacially selective temperature rise and a potential difference between the X and Y conductors. However, the present description has concentrated on the application of electrical signals.

In summary, an electrophoretic display is disclosed which uses a non-Newtonian fluid as the medium in which micron-sized charged particles are distributed. The fluid is chosen to operate over the normal operating temperatures of the device.

Some suitable "non-dichroic" dye is dissolved in the fluid to make its color contrasting relative to the color of the other suspended particles. As an example, the "non-dichroic" dye can be black and the particles can be white.

Now, therefore, this cell will operate as a normal electrophoretic cell when a full select electric field is applied. That is, particles will travel from one wall of the cell to the opposite wall.

When reaching either wall, the particles will adhere to the wall providing permanent indicia. When a half select electric field is applied to the cell, the fluid molecules will not undergo sheer; particles already at the wall will not move away from the wall; and particles in suspension will inhibit an incremental translation because of the high static vicosity exhibited by the fluid medium.

The properties of such cells are, therefore, ideal for a reflective type of display.

Other embodiments may be suggested by the previous description and it is therefore intended that the present invention be limited by the full scope of the language of the following claims.

What is claimed is:

1. An electrophoretic display element comprising a first and a second electrode, a transparent container surrounding said electrodes, a non-Newtonian solution within said transparent container, and a potential source connected between said terminals such that the application of the potential to said terminals creates an electric field therebetween which activates said non-Newtonian solution when the electric field exceeds a predetermined threshold level.

2. The electrophoretic display as set forth in claim 1 wherein said potential source is a direct current supply.

3. The electrophoretic display element as set forth in claim 1 wherein at least one of said electrodes is transparent.

4. The electrophoretic supply as set forth in claim 1 wherein one of said electrodes is formed as a predetermined figure.

5. An electrophoretic display element comprising a first and second electrode, a potential source having a positive and a negative terminal, which terminals are respectively connected to said first and second electrodes, a glass substrate container surrounding said first and second electrodes, and a non-Newtonian solution in said glass substrate container whereby the electric field created by the application of said potential source to said electrodes causes a force on the suspended particles which in turn apply a sheer force to the molecules of the fluid when said electric field exceeds a predetermined threshold level.

6. An electrophoretic matrix display panel comprising a plurality of electrophoretic display elements arranged in an X-Y matrix, each of said plurality of display elements further comprising a first and a second electrode, a transparent container surrounding said electrodes, a non-Newtonian solution within said transparent container, a plurality of X line driving circuits and a plurality of Y line driving circuits, said plurality of X and Y line driving circuits respectively connected to the electrodes of said plurality of display elements so that the simultaneous application of the current from an X and a Y line driving circuit to a particular element will exceed a predetermined threshold level to indirectly activate the non-Newtonian solution contained in that selected electrophoretic display element whereas the application of only half the voltage between the X and Y line driving circuit will not exceed said threshold level.

7. An electrophoretic matrix display panel comprising a plurality of electrophoretic display elements arranged in an X-Y matrix, each of said plurality of display elements containing a non-Newtonian solution solely capable of activation by a pair of simultaneous signals whose sum exceeds a predetermined threshold level.

* * * * *

UNITED STATES PATENT AND TRADEMARK OFFICE
CERTIFICATE OF CORRECTION

PATENT NO. : 4,311,361
DATED : January 19, 1982
INVENTOR(S) : Arpad Somlyody

It is certified that error appears in the above-identified patent and that said Letters Patent are hereby corrected as shown below:

Column 3, line 39, "8" should be "18".

Signed and Sealed this

Sixteenth Day of November 1982

[SEAL]

Attest:

GERALD J. MOSSINGHOFF

Attesting Officer    Commissioner of Patents and Trademarks